(12) United States Patent
Zimmer et al.

(10) Patent No.: US 6,717,739 B2
(45) Date of Patent: Apr. 6, 2004

(54) OBJECTIVE FOR STEREOMICROSCOPES OF THE TELESCOPE TYPE

(75) Inventors: Klaus-Peter Zimmer, Heerbrugg (CH); Ruedi Rottermann, Berneck (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/453,972

(22) Filed: Jun. 4, 2003

(65) Prior Publication Data
US 2003/0227672 A1 Dec. 11, 2003

(30) Foreign Application Priority Data
Jun. 6, 2002 (DE) .......................................... 102 25 192

(51) Int. Cl.$^7$ .............................................. G02B 21/02
(52) U.S. Cl. ........................ 359/661; 359/659; 359/656
(58) Field of Search ................................. 359/656–661, 359/376–378, 362

(56) References Cited

U.S. PATENT DOCUMENTS

| | | | |
|---|---|---|---|
| 4,518,231 A | * | 5/1985 | Muchel et al. .............. 359/661 |
| 4,640,586 A | | 2/1987 | Iba et al. |
| 6,226,119 B1 | * | 5/2001 | Kurata ........................ 359/376 |
| 6,313,952 B1 | * | 11/2001 | Yonezawa ................... 359/661 |
| 6,392,814 B1 | * | 5/2002 | Ono ............................ 359/661 |

FOREIGN PATENT DOCUMENTS

| | | |
|---|---|---|
| DE | 197 18 102 A 1 | 4/1997 |
| JP | 10170832 A | 6/1998 |
| JP | 2001147378 A | 5/2001 |

\* cited by examiner

*Primary Examiner*—Georgia Epps
*Assistant Examiner*—M. Hasan
(74) *Attorney, Agent, or Firm*—Hodgson Russ LLP

(57) ABSTRACT

The invention relates to an objective (2) for stereomicroscopes of the telescope type which comprises three optical assemblies (G1, G2, G3), the first assembly (G1) being arranged towards the object side and the third assembly (G3) being arranged towards a magnification changer (3L, 3R). The proposed objective (2) meets the conditions $0.44 \leq ENP/F \leq 0.6$, where ENP denotes the diameter of the entry pupil of the magnification changer (3L, 3R) at the maximum magnification and F denotes the focal length of the objective (2), and $\tan(w1) \geq 0.16$, where w1 denotes the maximum field angle of the objective (2) at the lowest magnification of the magnification changer (3L, 3R). The proposed objective (2) makes it possible to use a stereomicroscope with maximum resolution and a field of vision which is adapted to the full range of magnifications of the microscope.

14 Claims, 7 Drawing Sheets

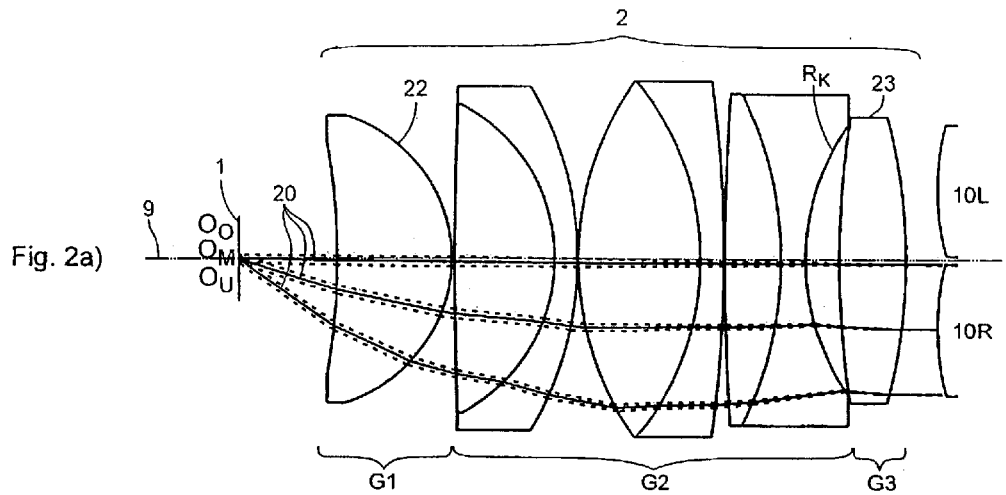
Fig. 2a)
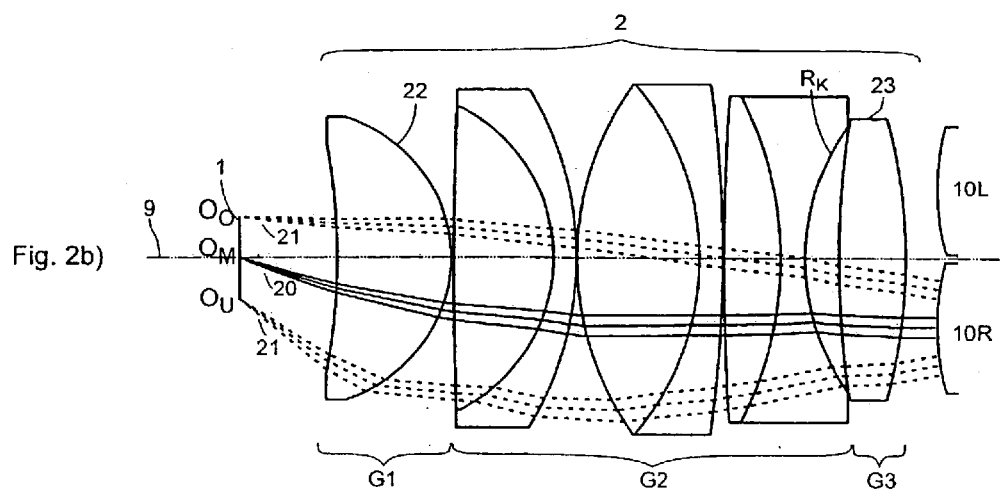
Fig. 2b)
Fig. 2

OBJECTIVE FOR STEREOMICROSCOPES OF THE TELESCOPE TYPE

FIELD OF THE INVENTION

The invention relates to a high resolution objective for stereomicroscopes of the telescope type which contains three optical assemblies, the first assembly being arranged towards the object end and the third assembly being arranged towards a magnification changer.

DESCRIPTION OF THE RELATED ART

Stereomicroscopes are usually equipped with a magnification changer which on the one hand allows high magnification of the object and on the other hand makes it possible to view large object fields. These devices are used for example in technology, for manipulating and inspecting small objects such as, for example, semiconductor structures or micromechanical objects, in research institutes involved in biosciences and materials science and also, for example, for examining and manipulating cells or for surgical purposes. In the course of miniaturising and researching into ever smaller preparations, the requirements imposed on the resolution of these microscopes are increasing and on the other hand the size of the field of vision becomes more important with less magnification for rapid positioning of the slides and for improving the overall view in observations.

In order to vary the magnification of a stereomicroscope magnification changers (the telescopic or zoom principle) are inserted behind the objective. The ratio of maximum to minimum magnification is designated z. Using a zoom the magnification can be varied smoothly over a particular range. Afocal zooms are known which image object rays from infinity to infinity and allow the magnification to be varied without altering the position of the object and the image.

FIG. 1 shows the basic structure of a stereomicroscope of the telescope type. The stereomicroscope allows the user, whose eyes are indicated as 8R and 8L, to obtain a three-dimensional impression of the object 1 being observed. The object 1, which is in the front focal point of the objective 2, is imaged using two separate optical channels. The two viewing channels 10L and 10R are of similar construction and each contain a magnification changer system 3L, 3R, a tube lens 4L, 4R and an eyepiece 7L, 7R. Image reversing systems 5L, 5R mounted behind the tube lenses 4L, 4R provide upright intermediate images 6L, 6R on the correct side which are visually viewed using the pair of identical eyepieces 7L, 7R. These pairs of optical elements are arranged parallel and symmetrical to the axis of the objective 2. The two magnification changers 3L, 3R alter the magnification selectively but in the same way for the left and right hand channels 10L, 10R.

The two intermediate images 6L and 6R are different images of the object 1 as the object 1 is viewed at an angle wL in the left hand channel 10L and at an angle wR in the right hand channel 10R. In this way it is possible to view the object 1 stereoscopically in the same way as when looking directly at an object through the eyes 8L, 8R. The two different images are processed in the brain to form a three-dimensional image impression.

EP denotes the diameter of the entry pupil of the magnification changers 3L, 3R which are adjustable in the same way. uL and uR denote the half aperture angles of the cone with the vertex in the centre of the object OM, which is bounded by the entry pupil. uL and uR are the same size, as the microscope is symmetrical with respect to the axis 9 of the objective 2. Consequently, uL and uR may both be referred to as u. As wR and wL are not large, the equation $EP = 2 \times F \times \sin(u) = 2 \times F \times nA$ applies here, where nA is the effective numerical aperture (in air) of the objective, based on the entry pupil of the magnification changer 3L or 3R downstream of the objective 2 and F is the focal length of the objective 2, this equation being known for well corrected optical systems which satisfy the sine condition. With a wavelength of $\lambda = 550$ nm the resolution capacity is $3000 \times nA$ as a rule of thumb (in pairs of lines per mm). Thus, a high aperture is a prerequisite for a high resolution.

At the maximum magnification of the magnification changer 3L, 3R the entry pupil diameter EP is at its maximum and is then known as ENP. The magnification changers shown may be the afocal zooms or telescope systems mentioned earlier.

FIG. 1 also shows the path of a ray running from the lower edge of the object Ou to the edge of the intermediate image. It forms an angle w in the space between the objective and the magnification changer with the axis 9 of the objective 2. w is the field angle of the objective 2, which is at its maximum when the magnification of the magnification changer 3L and 3R is at its weakest. The maximum value of w is hereinafter referred to as w1. The object width, i.e. the spacing of the object 1 from the first surface of the objective 2, is designated OW.

FIG. 1 shows the objective 2 purely diagrammatically. As a rule, the objectives form lens systems consisting of individual lenses and/or cemented lenses (cemented members).

Published Japanese Application JP 2001-147378 discloses an objective system for a stereomicroscope which consists of three sets of lenses, the two outer sets of lenses having a positive refractive power while the central set of lenses comprises at least one cemented member consisting of three lens elements. In one embodiment by way of example, the lens assembly at the object ends consists of a single lens followed by the second lens assembly which contains two cemented members having three or two cemented lenses, which is in turn followed by the third lens assembly consisting of a cemented member with two lenses. This structure is intended to suppress the optical imaging errors, distortion and chromatic aberration as far as possible. The embodiments published have a numerical aperture nA of 0.13 and 0.20. The resolution of these objectives is thus within the known range.

Published Japanese Application JP 101 70 832 A describes a conversion lens which can be placed in front of the objective in a stereomicroscope and in conjunction with this main objective produces a short focal length. As a result of the high magnification produced, the conversion lens is used for viewing extremely small object structures while in order to observe the object in a large field of vision the conversion lens can be removed. The disadvantage of such a construction is the high number of lenses used and the need to install or remove a conversion lens. The proposed combination consists of a total of twelve lenses. The conversion lens in the publication referred to consists of three lens assemblies of which the two outermost have positive refractive power and each consist of two cemented lenses while the central lens assembly is a cemented component in the shape of a meniscus. The actual main objective, viewed from the object end, consists of a single lens followed by a cemented member consisting of two lenses, followed by another cemented member comprising two lenses and another single lens.

Olympus provide a conversion lens of this kind under model reference SZX-AL20. The combination of conversion lens and objective has a numerical aperture of nA=0.275 but can only be used in a limited range of the zoom, outside which the image is cut by vignetting. The object spacing OW of the combination of objective and conversion lens is only about 10 mm, thus making it substantially more difficult to work with objects under the microscope.

The present applicants have marketed a stereomicroscope under model reference "MZ 12" for which objectives with a focal length of F=50 mm and a maximum entry pupil diameter of ENP=20 mm are available. In this objective, which already has a high magnification, the spacing of the object from the first surface of the objective OW=21.3 mm, making it possible to work with objects under acceptable conditions.

Finally, U.S. Pat. No. 4,640,586 discloses an objective for a stereomicroscope of the telescope type which helps to avoid optical illusions with regard to flatness when examining an object. In one embodiment (Example 5) the objective consists of two individual lenses with positive refractive power followed by a meniscus-shaped cemented member followed by another meniscus-shaped cemented member and a third individual lens with positive refractive power. The focal length is 49.98 mm, the spacing of the axis of the magnification changers is given as 22 mm, which means that the maximum diameter of the circular entry pupil of the magnification changer must be a little less than 22 mm.

SUMMARY OF THE INVENTION

The aim of the present invention is to provide an improved objective of the type specified which when used in a stereomicroscope with a magnification changer has a high resolution with powerful magnification adapted thereto, the resolution capacity being higher than that of known stereomicroscopes, and wherein furthermore the entire range of magnifications of the microscope should be useable without any vignetting. At the same time the microscope should have the largest possible working gap.

This problem is solved by an objective according to the main claim. Some advantageous embodiments will become apparent from the subsidiary claims and the description that follows.

According to the invention the objective for stereomicroscopes of the telescopic type with a magnification changer meets two conditions, namely $$0.44 \leq \frac{ENP}{F} \leq 0.6 \quad (B1)$$

at the maximum microscope magnification and
(B2) $0.16 \leq \tan(w1)$ at the lowest microscope magnification.

Condition B1 provides a lower and an upper limit for the half aperture angle u (see FIG. 1) of the cone of rays with its vertex in the centre of the object OM, which is defined by the entry pupil at the maximum magnification. The sine of the aperture angle u corresponds to the numerical aperture nA of the stereomicroscope. As the resolution capacity is furthermore proportional to the numerical aperture nA of the stereomicroscope, the condition B1 constitutes a lower and upper limit for the resolution. The condition B1 links the focal length of the objective to the maximum diameter of the entry pupil of the magnification changer and ensures that the maximum microscope magnification is adapted to the resolution of the microscope and that no empty magnification is produced if, as usual, only the optical system comprising the magnification changer, tube and eyepiece is working within the range of the useful magnification.

Condition B2 provides a lower limit for the field angle w of the objective (see FIG. 1) at the weakest magnification of the microscope. Meeting this condition guarantees that in microscopes in which the ratio z of maximum to minimum magnification is large, even at the lowest magnification the entire field of vision theoretically obtained can be used without any vignetting.

Stereomicroscope objectives of the kind mentioned which satisfy conditions B1 and B2 differ from those of the prior art in that they have a higher resolution and can be used throughout the range of magnifications of the microscope (without the additional use of conversion lenses or the like and without any vignetting).

If, for example, a zoom with a zoom factor $z \geq 12$ and an eyepiece with a visual field number of $\geq 21$ mm is used as the magnification changer, in stereomicroscopes operating in the range of useful magnification, it is no longer possible to use the entire field of vision theoretically produced if at the lowest magnification it falls below the lower limit set by condition B2.

It is particularly advantageous to set the lower limit of condition B1 as 0.55 to ensure a significant increase in the resolution of the objective. Embodiments of objectives are given hereinafter by way of example satisfying the conditions specified above.

In the objective according to the invention which consists of three optical assemblies, further conditions for the first assembly G1 facing the object and for the third assembly G3 remote from the object have proved advantageous, while the following equation should apply to the focal length f1 of the first assembly:

$$1.3 < \frac{f1}{F} < 1.8,$$

while this first assembly in particular consists of a single lens, and the following equation $$2 < \frac{f3}{F} < 4,$$

should apply to the focal length f3 of the third assembly, and the third assembly in particular also consists of only a single lens.

A shorter focal length of the first optical assembly (in other words f1<1.3×F) in the embodiments of the objective according to the invention results in greater aberrations at the edge of the image which are difficult to compensate for in the subsequent assemblies G2 and G3. If on the other hand the focal length f1 exceeds a value of 1.8×F this results in a larger objective diameter which results in undesirably high weight. All in all, it has proved advantageous to construct the first assembly G1 as an individual lens.

Even though only parts of the aperture of the objective are used during stereo viewing in each channel, it is nevertheless essential to have good correction of the aperture error of the objective with the full aperture. This is best done on the third optical assembly of the objective as the beam diameter is great at this point. A focal length f3 corresponding to 2 to 4 times the focal length of the objective as a whole has proved advantageous. A longer or shorter focal length is unsuitable for compensating the aperture error which is not necessarily fully corrected in the assemblies G1 and G2. Moreover, a shorter focal length f3 makes it more difficult to construct the assembly G1 and particularly the assembly G2 if a substantial working distance OW is required. It has been found that the optical assembly G3 can advantageously be produced as a single lens.

The term $$\frac{OW}{F} \geq 0.42$$

correlates the spacing of the object plane from the first surface of the assembly G1 of the objective according to the invention with the total focal length F of this objective and guarantees an object distance which allows the user to work comfortably underneath the microscope. With a preferred objective focal length of F=40 mm, OW must be $\geq 16.8$ mm.

With regard to the second optical assembly G2 it has proved favourable if the last radius Rk of this second group pointing towards the group G3 satisfies the term $$0.7 < \frac{Rk}{F} < 1.1.$$

In this given range it is possible, in
  particular, to adapt the assemblies G2 and G3 to one another in such a way that for objectives with high apertures and large fields of this kind it is possible to correct the imaging errors with a small number of lenses. A construction in which the three optical assemblies consist of a total of not more than 8 lenses is possible and beneficial, with a high imaging quality, as the costs and weight of the stereomicroscope go up as the number of lenses increases.

High quality correction of chromatic aberrations can be achieved by a suitable choice of optical glass which satisfies the conditions $$|P_{g,F} - 0.6438 + 0.001682 \times v_d| > 0.0075$$

or $$|P_{C,t} - 0.5450 - 0.004743 \times v_d| > 0.025,$$

where $v_d = (n_d - 1)/(n_F - nC)$ is the Abbe coefficient, $P_{g,F} = (n_g - n_F)/(n_F - n_C)$ denotes the relative partial dispersion for the wavelengths g and F and $P_{C,t} = (n_C - n_t)/(n_F - n_C)$ indicates the relative partial dispersion for the wavelengths C and t and n denotes the refractive index at the wavelength in question.

With lenses of this kind it is possible not only to correct the primary chromatic aberrations but also to reduce the secondary spectrum significantly. It is particularly advantageous to use lenses of this kind for the optical assembly G3 which consists in particular of a single lens.

A further advantage arises from the use of at most three different materials, particularly the above mentioned chromatic aberration correcting glass, for the optical assemblies of the objective according to the invention.

BRIEF DESCRIPTION OF THE DRAWINGS

Some embodiments exemplifying the invention and its advantages will be explained more fully hereinafter with reference to the figures, wherein:

FIG. 2 is a sketch of an objective according to the invention showing the optical path for the maximum (FIG. 2a) and minimum (FIG. 2b) magnification of the magnification changer;

DETAILED DESCRIPTION OF THE INVENTION

Figure 1:
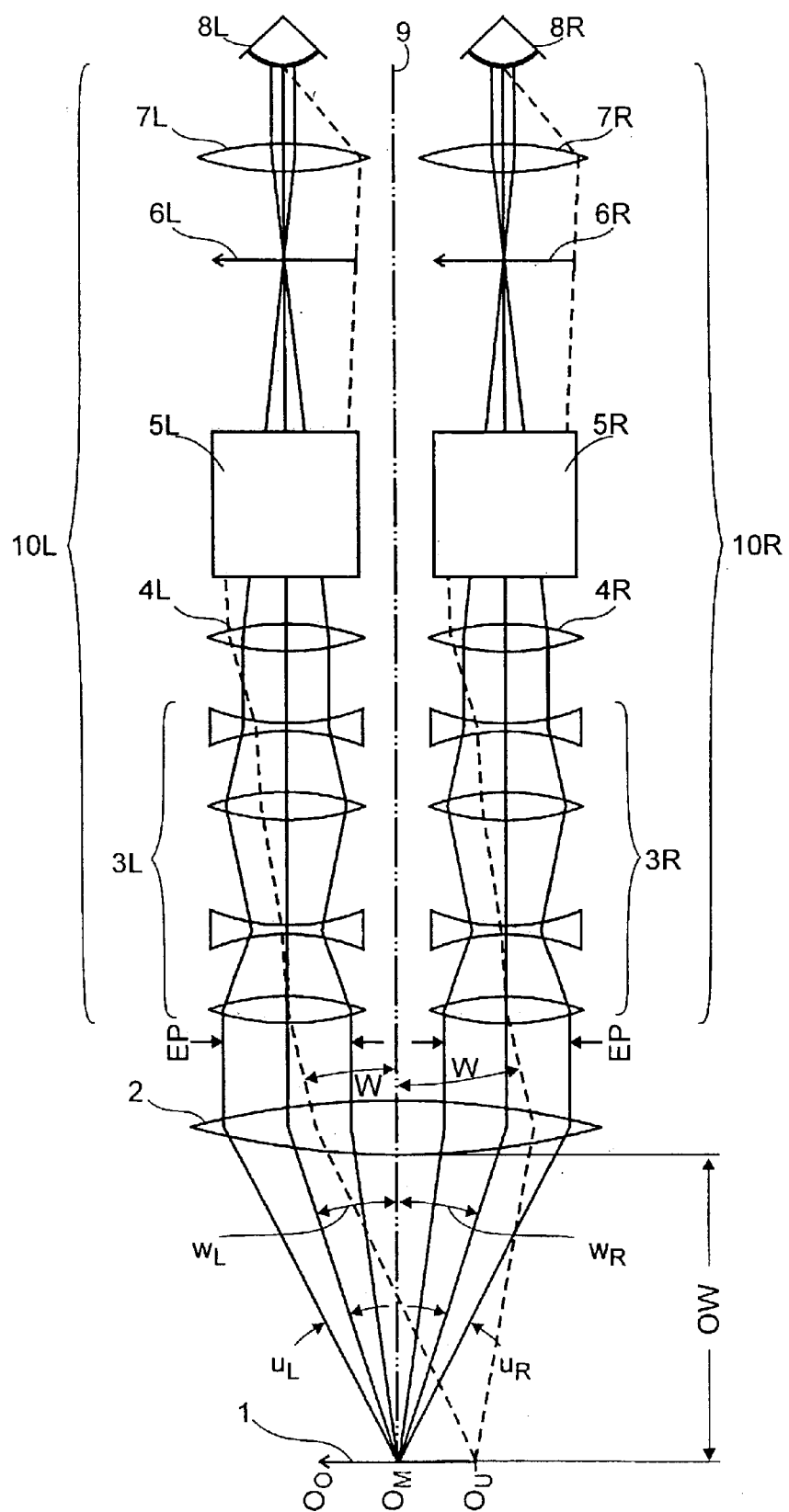
FIG. 1 is a diagrammatic view of a stereomicroscope of the telescope type according to the prior art.

The stereomicroscope diagrammatically shown in FIG. 1 has been discussed in detail in the introduction to the description. The objective 2 is shown in highly simplified form.

The following three embodiments of the objective according to the invention show arrangements of lenses which meet the above mentioned conditions B1 and B2. The objective 2 according to the invention constitutes the objective 2 which is only diagrammatically shown in FIG. 1, discussed above.

First Embodiment

FIG. 2 shows the diagrammatic lens section through the first embodiment. On the right hand side of the drawing the two parallel stereochannels 10L and 10R are diagrammatically shown. On the left hand side of the drawing the object 1 is diagrammatically shown. The optical path shown is restricted to the rays of one stereochannel 10R for reasons of clarity. The lines 20 describe the beam proceeding from the centre OM of the object and the lines 21 describe the beam proceeding from the top or bottom edge Oo, Ou of the object.

The objective 2 is made up of eight lenses subdivided into five components separated by air gaps. The first assembly G1 is the first lens component nearest the object. It consists of a single lens 22 with a positive refractive power. The third optical assembly is the lens component facing the magnification changer, which also consists of a single lens 23 with a positive focal length. The intermediate lens components are combined to form a second optical assembly G2. The last radius Rk of the assembly G2 is concave. OW denotes the distance of the object 1 from the first surface of the first optical assembly G1 (see FIG. 1).

FIG. 2 shows that the beam 20 which proceeds from the centre OM of the object does not run through the objective 2 symmetrically to the optical axis 9 of the objective 2. It is also clear that the beams 21 run from the upper edge Oo and from the lower edge Ou of the object 1 asymmetrically with respect to the optical axis 9 of the objective 2.

FIG. 2a shows that in the case of powerful magnification the optical assembly G1 (single lens 22) reduces the aperture angle significantly and therefore does not produce any major imaging errors in light beams (beams 20) proceeding from the centre OM of the object. As is clear from FIG. 2b, by contrast, in the case of weak magnification, the light from the edge of the field (particularly beam 21 Ou) is sharply refracted, so that a large diameter objective is avoided. A focal length f1 of the assembly G1 which corresponds to 1.3 to 1.8 times the focal length F of the objective 2 as a whole has proved advantageous in this connection. A lens component of this kind may even be produced as a single lens 22, as shown. A shorter focal length f1 of the first assembly G1 would lead to greater aberrations at the edge of the image under weak magnification (see FIG. 2b) which is difficult to compensate in the following assemblies G2 and G3. By contrast, a longer focal length f1 would result in a larger diameter objective which would involve an undesirably high weight. In the embodiment shown f1/F=1.58.

Although only parts of the aperture of the objective 2 are used in the stereoviewing of each channel 10L and 10R (see FIG. 1) it is nevertheless essential to have good correction of the aperture error of the objective 2 at full aperture. As the beam diameter is considerable in optical assembly G3 the correction is preferably carried out there. It has been found that a focal length f3 of the optical assembly G3 which corresponds to 2 to 4 times the focal length F of the objective as a whole is advantageous for these purposes. The assembly G3 may advantageously even be produced as a single lens 23. A longer or shorter focal length f3 would not be capable of compensating the aperture error which is not necessarily totally corrected in assemblies G1 and G2 alone. A shorter focal length f3(<2F) makes it more difficult to construct the optical assembly G1 and particularly the assembly G2 if a substantial working distance OW from the object 1 is required. In the present embodiment f3/F=3.14 and OW/F=0.42.

Adjusted with the initial radius Rk, k=11 (11th surface of the objective 2 with R11/F=1.03, an assembly G3 of the configuration described above is an effective means of allowing the correction of imaging errors with a low number of lenses (in this example 8) for objectives with such high apertures and large fields.

In the first embodiment shown the ratio of the entry pupil diameter ENP at the maximum magnification of the magnification changer to the focal length F of the objective 2 is ENP/F=0.56, thus complying with the preferred condition 0.55<ENP/F≦0.6. The maximum field angles w1 of the objective 2 at the lowest magnification, at tan(w1)=0.19, satisfies the condition (B2) tan(w1)≧0.16. The objective 2 of the first embodiment shown thus satisfies conditions B1 and B2, therefore has a higher resolution than known objectives and can be used across the entire range of magnifications of the stereomicroscope, particularly without vignetting at low magnification.

Table 1 which follows describes in detail the data for the first embodiment shown, standardised for a focal length of F=100 mm. The assembly G1 consists of a single lens (surface nos. 1, 2), the assembly G2 consists of three cemented components (surface nos. 3, 4, 5; 6, 7, 8 and 9, 10, 11), the last assembly G3 consists of the single lens 23 (surface nos. 12 and 13).

TABLE 1

| Assembly | Surface number | Radius (mm) | Distance (mm) | $n_d$ | $v_d$ | $P_{g,F}$ | $P_{C,t}$ |
|---|---|---|---|---|---|---|---|
|  | Object |  | 42.13 |  |  |  |  |
| G1 | 1 | −291.92 | 48.69 | 1.49700 | 81.6 | 0.5375 | 0.8236 |
| G1 | 2 | −65.47 | 1.25 |  |  |  |  |
| G2 | 3 | 2181.33 | 41.95 | 1.49700 | 81.6 | 0.5375 | 0.8236 |
| G2 | 4 | −76.18 | 9.99 | 1.80518 | 25.4 | 0.6161 | 0.6680 |
| G2 | 5 | −145.47 | 0.25 |  |  |  |  |
| G2 | 6 | 137.39 | 52.31 | 1.49700 | 81.6 | 0.5375 | 0.8236 |
| G2 | 7 | −119.86 | 9.99 | 1.61336 | 44.5 | 0.5590 | 0.7936 |
| G2 | 8 | −572.97 | 0.50 |  |  |  |  |
| G2 | 9 | 1128.57 | 23.85 | 1.80518 | 25.4 | 0.6161 | 0.6680 |

TABLE 1-continued

| Assembly | Surface number | Radius (mm) | Distance (mm) | $n_d$ | $v_d$ | $P_{g,F}$ | $P_{C,t}$ |
|---|---|---|---|---|---|---|---|
| G2 | 10 | −162.05 | 10.36 | 1.61336 | 44.5 | 0.5590 | 0.7936 |
| G2 | 11 | 103.47 | 14.33 |  |  |  |  |
| G3 | 12 | 425.00 | 28.09 | 1.49700 | 81.6 | 0.5375 | 0.8236 |
| G3 | 13 | −240.91 |  |  |  |  |  |

The columns of the Table show, from left to right, the assembly number, the surface number, the radius of curvature, the distance from the next surface, the refractive index $n_d$, the dispersion $v_d$ and the partial dispersions $P_{g,F}$ and $P_{C,t}$. $n_d$ denotes the refractive index, $v_d=(n_d-1)/(n_F-n_C)$ the Abbe coefficient, $P_{g,F}=(n_g-n_F)/(n_F-n_C)$ the relative partial dispersion for the wavelengths g and F, and $P_{C,t}=(n_C-n_t)/(n_F-n_C)$ the relative partial dispersion for the wavelengths C and t. An air gap is indicated by an empty line in the details of materials.

The wavelengths g and F denote the blue mercury or blue hydrogen line at 435.83 nm and 486.13 nm, respectively. The wavelengths C and t denote the red hydrogen and infra red mercury line at 656.27 nm and 1013.98 nm, respectively. Wavelength d denotes the yellow helium line at 587.56 nm.

This type of objective is characterised by the high quality of the correction of the chromatic aberrations, given a suitable choice of optical glass. When special glass is used not only are the primary chromatic aberrations corrected but also the secondary spectrum is significantly reduced. For the majority of glass (standard glass) the following linear equations (standard straight lines) apply approximately:

$$P_{n\ g,F}=0.6438-0.001682*v_d,$$

$$P_{n\ C,t}=0.5450+0.004743*v_d.$$

The glass used in this embodiment does not comply with these linear equations but differs from at least one of these linear equations. The differences in the relative partial dispersion from the normal line are $$|P_{g,F}-P_{n\ g,F}|>0.0075$$

or $$|P_{C,t}-P_{n\ C,t}|>0.025.$$

Figure 3:
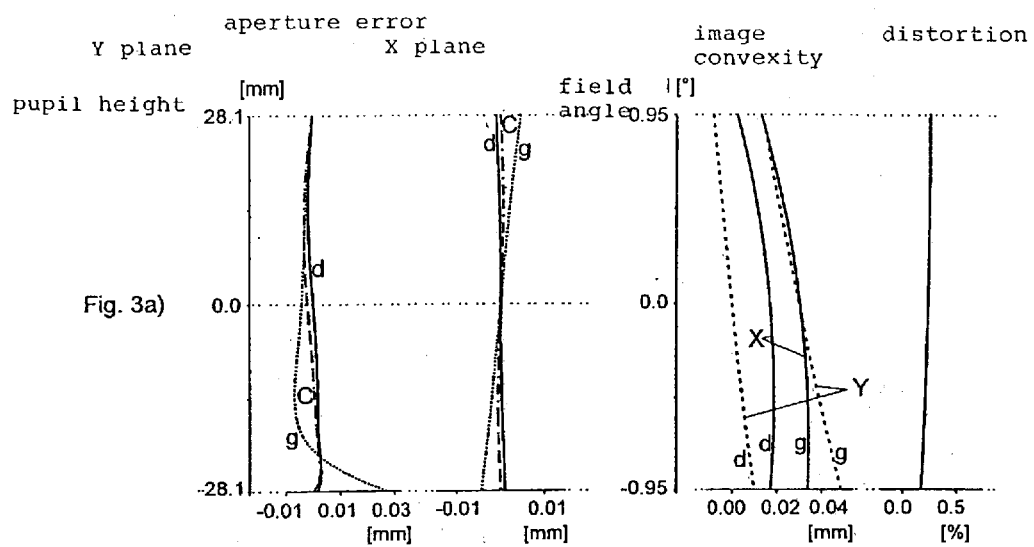
FIG. 3 shows the imaging power of the objective for the strongest (FIG. 3a) and weakest (FIG. 3b) magnification.
Figure 3:
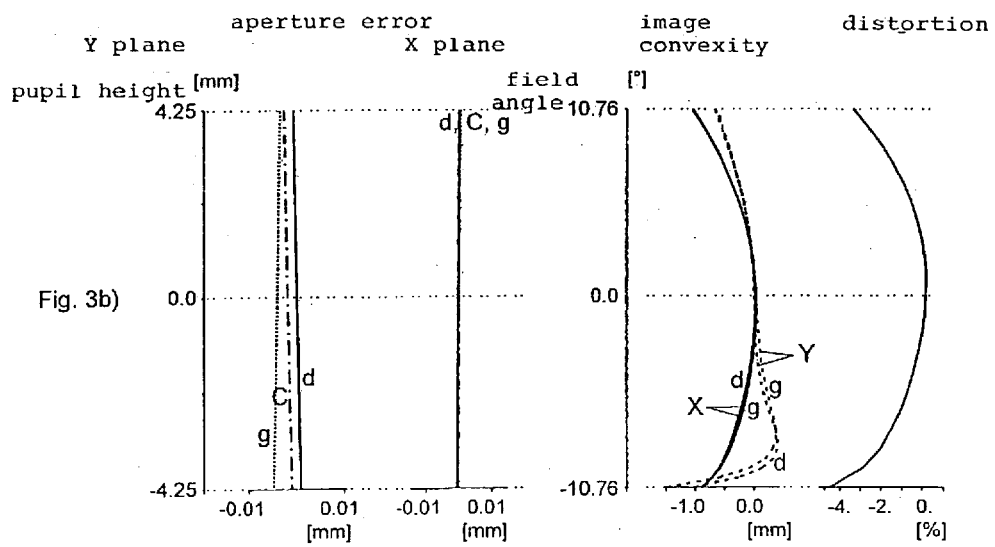

The imaging power of the objective 2 is shown in FIG. 3, the most powerful magnification of the microscope being shown at the top (FIG. 3a) while the weakest magnification is shown at the bottom (FIG. 3b).

The imaging errors are determined in the opposite direction to that of the light, as is conventional in microscopy, i.e. the aberrations are given in the plane of the object, while a beam coming from infinity counter to the direction of the light is imaged by the objective. The aperture error is shown as a transverse aberration, the convexity of the image as a longitudinal aberration and the distortion in percent.

Because of the passage of the light beam through the objective 2 being asymmetrically with respect to the optical axis 9 of the objective 2, the aperture error is recorded both in a section (Y plane) which contains both optical axes of the magnification changer 3 and also in a section perpendicular thereto (X plane). Both aperture errors are shown for the wavelength d=587.56 nm, C=656.28 nm and g=435.83 nm as a function of the relative pupil height (in mm).

The convexities of the images are given as a function of the field angle w (in °) for the wavelength d and g both in the Y plane and in the X plane. The distortion in the Y plane is also shown in percent as a function of the field angle w for the wavelength d.

The entry pupils are centred on the axis of the particular magnification changer 3L, 3R. The spacing of the axis of the magnification changers 3L and 3R is 59.9 mm. In FIG. 3a the diameter of the entry pupil EP=56.18 mm. The pupil is 2.5 mm away from the objective along the axis of the magnification changer. The maximum field angle w is 0.95°.

FIG. 3b shows the diameter of the entry pupil EP=8.49 mm. The pupil is 102.4 mm away from the objective along the axis of the magnification changer. The maximum field angle w1=10.76°.

In known manner, an objective with a focal length F=c× 100 mm is obtained by multiplying all the radii and distances by a factor c from the data in Table 1. The preferred focal length of the embodiment is F=40 mm, and therefore c=0.4. Using the same factor c the above data on the pupils and also the transverse and longitudinal aberrations of FIG. 3 can also be scaled in order to obtain these magnitudes for the preferred focal length according to the embodiment.

A comparison of the diameter of the refractive disc resulting from the numerical aperture with the small dimension of the transverse aberrations of the aperture error for the line d according to FIG. 3a after scaling for the focal length F=40 mm of this embodiment shows the skilled man that the objective also guarantees the higher than usual resolution expected on the basis of the high aperture.

The aperture errors provided for wavelengths C and g also prove the substantial reduction in the secondary chromatic aberrations.

FIG. 2b also shows that the field angle w1 can be used without vignetting as the beam 21 is not cut. FIG. 3b shows, after scaling to the focal length F=40 mm, that the entire field of vision can be used without any restrictions for stereoscopic observations, as demonstrated by the extremely well corrected aperture error and the minor lengthwise aberrations in the convexities of the image with only moderate distortion.

Second Embodiment

Figure 4:
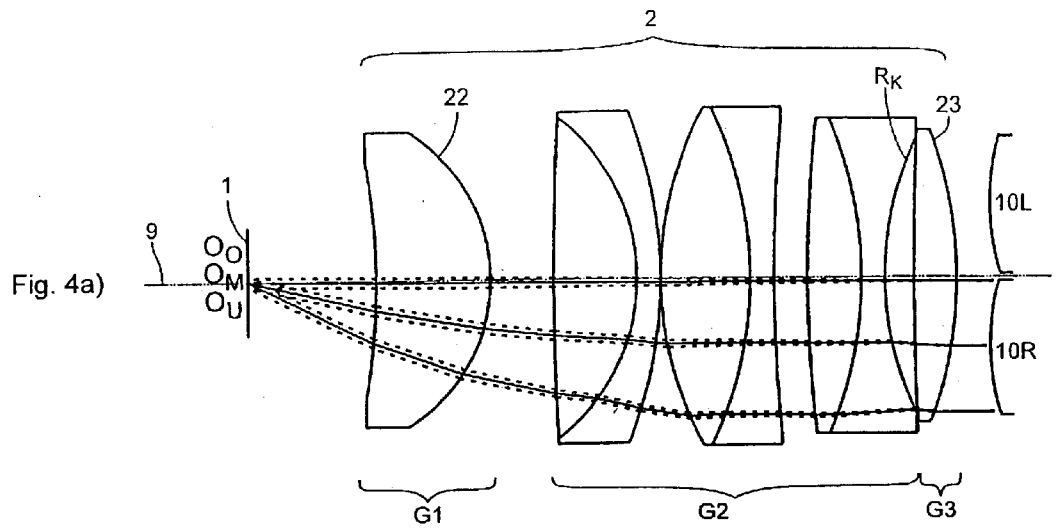
FIG. 4 shows a second embodiment of the objective according to the invention showing the optical path at maximum magnification (FIG. 4a) and minimum magnification (FIG. 4b) of the magnification changer.
Figure 4:
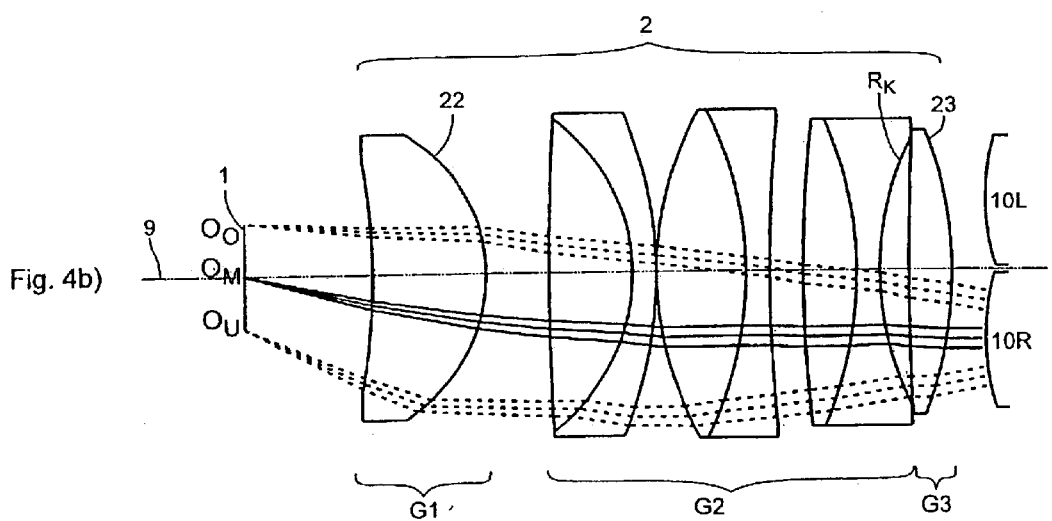

FIG. 4 diagrammatically shows a lens section through the second embodiment. Identical components to those in FIG. 2 have been given the same reference numerals. Unless otherwise stated in the description that follows, the same remarks apply to the objective 2 shown in FIG. 4 as to the first embodiment.

The objective 2 is again made up of eight lenses. The optical assembly G1 consists of a single lens 22 wherein f1/F=1.46, thus satisfying the condition 1.3<f1/F<1.8. Again the optical assembly G3 is constructed as a single lens 23, where f3/F=2.49, thus satisfying the condition 2<f3/F<4. The advantages which result from this include the one stated above in connection with the first embodiment.

For the last surface of the second optical assembly G2 (11th surface of the objective 2) R11/F=1.07, satisfying the condition 0.7<Rk/F<1.1 (k=11). For the width of the object, in this embodiment, OW/F=0.42. With regard to complying with the above mentioned conditions, the remarks made in connection with the first embodiment apply here.

In the second embodiment shown the ratio of the entry pupil diameter ENP at the maximum magnification of the magnification changer to the focal length F of the object 2 is ENP/F=0.44. Moreover, for the maximum field angle w1 of the objective 2 at the lowest magnification: tan(w1)=0.19. Thus, the objective 2 of the second embodiment satisfies the conditions B1 and B2 according to the invention. Thus, it has a higher resolution than known objectives which can be used throughout the entire range of magnifications of the stereomicroscope.

Table 2 that follows describes in detail the data of the second embodiment shown, standardised for a focal length of F=100 mm. The assembly G1 consists of a single lens (surface number 1, 2), the assembly G2 consists of three cemented components (surface numbers 3, 4, 5; 6, 7, 8 and 9, 10, 11), and the last assembly G3 consists of the single lens 23 (surface numbers 12 and 13).

TABLE 2

| Assembly | Surface number | Radius (mm) | Distance (mm) | $n_d$ | $v_d$ | $P_{g, F}$ | $P_{C,t}$ |
|---|---|---|---|---|---|---|---|
|  | Object |  | 42.00 |  |  |  |  |
| G1 | 1 | −217.52 | 37.60 | 1.49700 | 81.6 | 0.5375 | 0.8236 |
| G1 | 2 | −57.59 | 20.41 |  |  |  |  |
| G2 | 3 | 1012.75 | 27.68 | 1.49700 | 81.6 | 0.5375 | 0.8236 |
| G2 | 4 | −67.35 | 7.83 | 1.80518 | 25.4 | 0.6161 | 0.6680 |
| G2 | 5 | −145.90 | 0.20 |  |  |  |  |
| G2 | 6 | 120.00 | 29.22 | 1.49700 | 81.6 | 0.5375 | 0.8236 |
| G2 | 7 | −129.70 | 7.83 | 1.61336 | 44.5 | 0.5590 | 0.7936 |
| G2 | 8 | 544.70 | 10.98 |  |  |  |  |
| G2 | 9 | 480.42 | 17.53 | 1.80518 | 25.4 | 0.6161 | 0.6680 |
| G2 | 10 | −135.47 | 7.83 | 1.61336 | 44.5 | 0.5590 | 0.7936 |
| G2 | 11 | 106.88 | 9.60 |  |  |  |  |
| G3 | 12 | 1150.29 | 14.17 | 1.49700 | 81.6 | 0.5375 | 0.8236 |
| G3 | 13 | −138.32 |  |  |  |  |  |

With regard to the data in this Table the remarks made in connection with the first embodiment apply here.

For the glass used for the second embodiment the deviations of the relative partial dispersions from the normal lines specified for the first embodiment apply here too. This results in a type of objective which is characterised by a high quality of correction of the chromatic aberrations.

Figure 5:
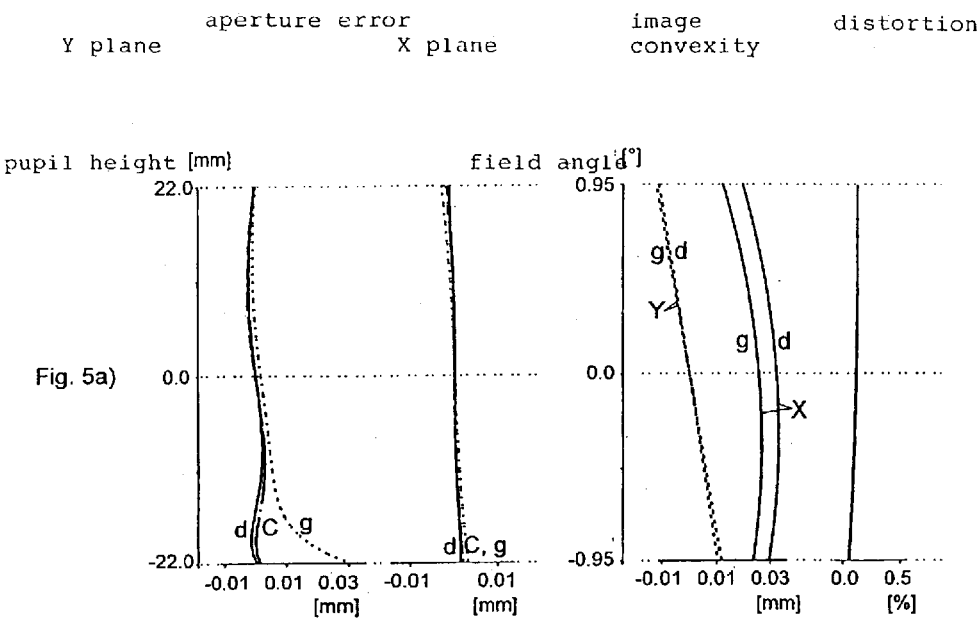
FIG. 5 shows the associated imaging power for the strongest (FIG. 5a) and weakest (FIG. 5b) magnification.
Figure 5:
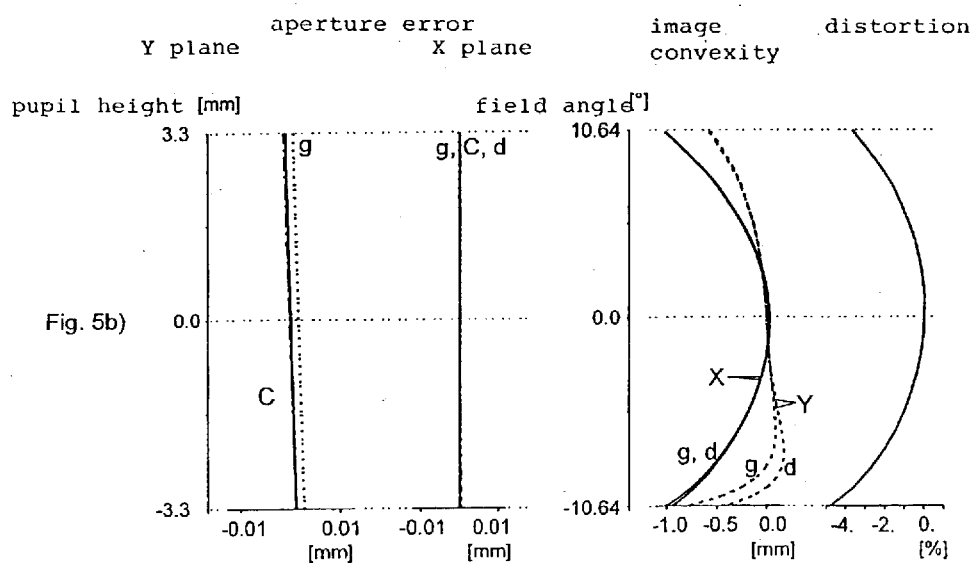

The imaging power of the objective is shown in FIG. 5.

The illustration is of the same type as in FIG. 3 and consequently the remarks made with respect to that apply here as well. The spacing between the axis of the magnification changers 3L and 3R in this case is 47.0 mm.

In FIG. 5a the diameter of the entry pupil ENP=44.0 mm. The pupil is 2.0 mm away from the objective along the axis of the magnification changer. The maximum field angle w=0.95°.

In FIG. 5b the diameter of the pupil EP=6.65 mm. The pupil is arranged at a distance of 80.2 mm from the objective along the axis of the magnification changer. The maximum field angle is w1=10.64°.

With regard to the scaling and the imaging power achieved the remarks made concerning the first embodiment apply analogously here. The preferred focal length F of the objective according to the second embodiment is about 50 mm.

Third Embodiment

Figure 6:
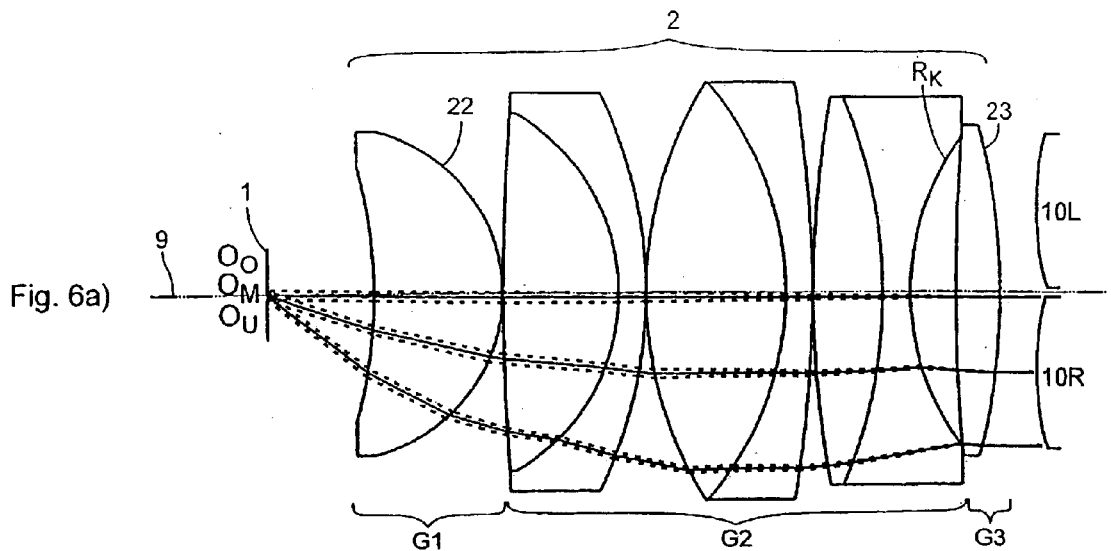
FIG. 6 shows a third embodiment of the objective according to the invention showing the optical path for the maximum (FIG. 6a) and minimum (FIG. 6b) magnification of the magnification changer.
Figure 6:
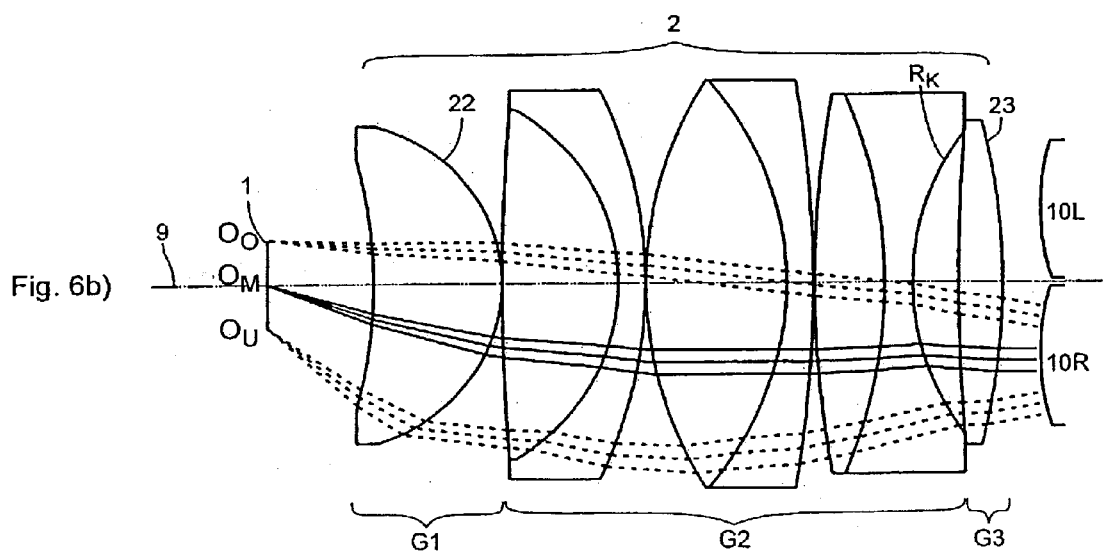

FIG. 6 diagrammatically shows the lens section through the third embodiment of an objective 2 according to the invention. This objective also consists of five components separated by airgaps, which can be subdivided into three groups. The first optical assembly G1 is in the form of a single lens 22 and the third optical assembly G3 is also in the form of a single lens 23. Three cemented components form the optical assembly G2. The objective 2 as a whole consists of eight lenses.

FIG. 6 again uses the same reference numeral to denote the same components as in the previous embodiments. Unless otherwise stated the remarks made concerning the other two embodiments described above also apply here. For the objective 2 of the third embodiment, ENP/F=0.6, thus satisfying condition B1 according to the invention, and tan(w1)=0.19, thus satisfying the second condition (B2) according to the invention. Also, for the focal length f1 of the assembly G1 (single lens 22) f1/F=1.70, thus satisfying 1.3<f1/F<1.8, the focal length f3 of the third optical assembly G3 (single lens 23) satisfies f3/F=3.68 and hence 2<f3/F<4.

Moreover for the object width OW/F=0.42 and for the last radius (11th surface) of the assembly G2, which points towards the assembly G3, R11/F=1.05. Thus, the third embodiment also satisfies the conditions 0.7<Rk/F<1.1 and OW/F≧0.42.

The advantages resulting from complying with the above conditions have already been described in detail in connection with the two embodiments described earlier. The foregoing remarks also apply here.

Table 3 which follows gives detailed data on the third embodiment shown, standardised for a focal length F=100 mm. The surface numbers are allocated to the particular assemblies in the same way as in the embodiments described above.

TABLE 3

| Assembly | Surface number | Radius (mm) | Distance (mm) | $n_d$ | $v_d$ | $P_{g, F}$ | $P_{C, t}$ |
|---|---|---|---|---|---|---|---|
| | Object | | 42.00 | | | | |
| G1 | 1 | −192.62 | 51.14 | 1.52855 | 76.98 | 0.5401 | 0.8111 |
| G1 | 2 | −66.82 | 0.27 | | | | |
| G2 | 3 | 977.72 | 45.32 | 1.52855 | 76.98 | 0.5401 | 0.8111 |
| G2 | 4 | −83.11 | 10.67 | 1.80518 | 25.4 | 0.6161 | 0.6680 |
| G2 | 5 | −183.88 | 0.27 | | | | |
| G2 | 6 | 158.41 | 55.97 | 1.52855 | 76.98 | 0.5401 | 0.8111 |
| G2 | 7 | −126.76 | 10.67 | 1.63775 | 42.41 | 0.5605 | 0.7880 |
| G2 | 8 | −487.71 | 0.53 | | | | |
| G2 | 9 | 457.69 | 27.12 | 1.80518 | 25.4 | 0.6161 | 0.6680 |
| G2 | 10 | −201.59 | 10.67 | 1.63775 | 42.41 | 0.5605 | 0.7880 |
| G2 | 11 | 105.15 | 17.86 | | | | |
| G3 | 12 | 794.95 | 17.56 | 1.52855 | 76.98 | 0.5401 | 0.8111 |
| G3 | 13 | −255.98 | | | | | |

The remarks made above also apply to the data in the Table. The glass used for the third embodiment also deviates from at least one of the normal lines used for the relative partial dispersions by amounts already specified for the first embodiment.

Figure 7:
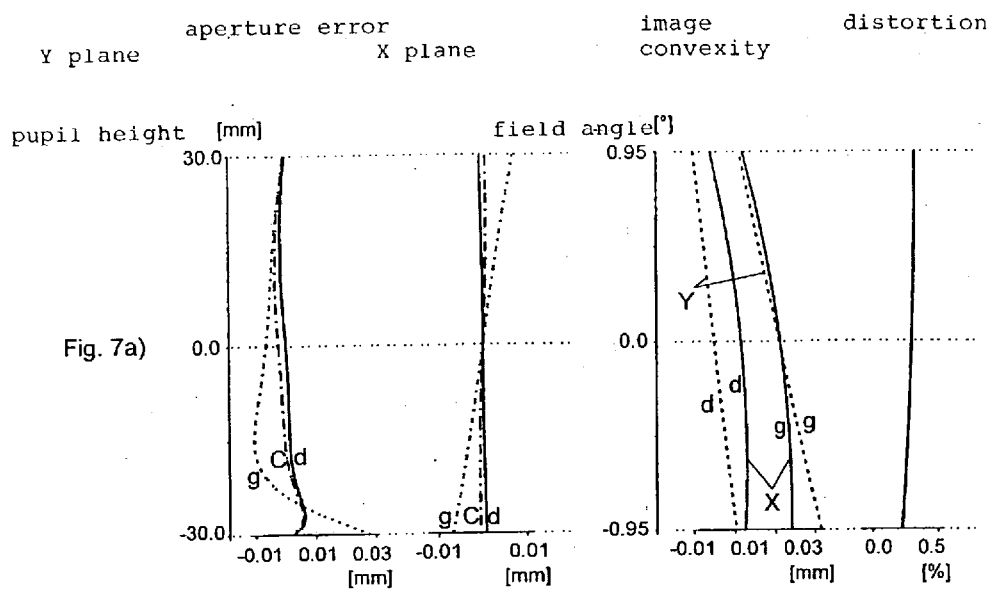
FIG. 7 shows the associated imaging power at the strongest (FIG. 7a) and weakest (FIG. 7b) magnification of the microscope.
Figure 7:
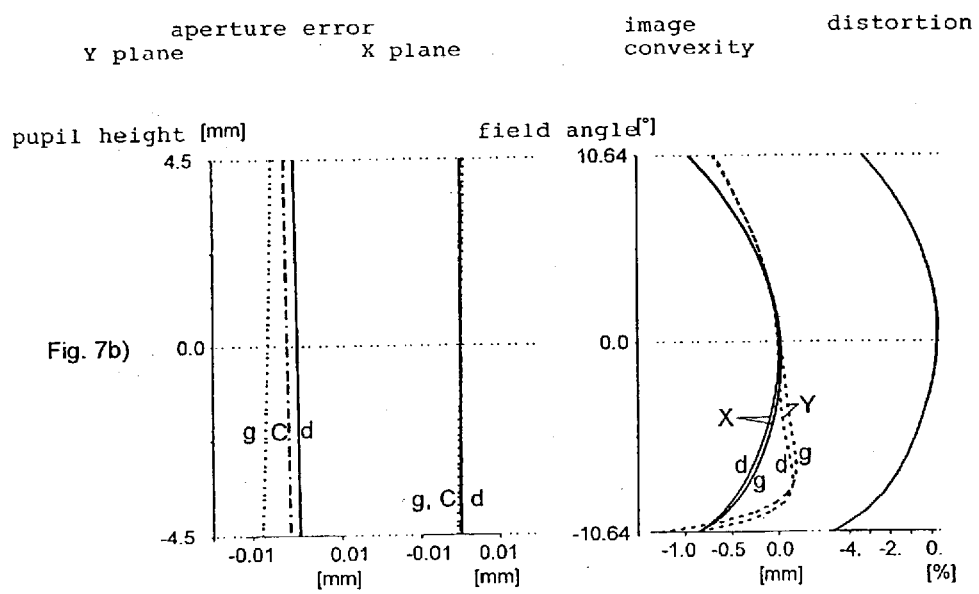

The imaging power of the object is shown in FIG. 7, for the case of maximum magnification of the microscope at the top (FIG. 7a) and for the weakest magnification at the bottom (FIG. 7b). The illustrations are completely analogous to FIGS. 3 and 5 discussed earlier and consequently the remarks made concerning them also apply here.

The distance between the axis of the magnification changers 3L and 3R in this case is 47.0 mm.

In FIG. 7a the diameter of the entry pupil ENP=60.0 mm. The pupil is at a distance of 2.7 mm from the objective along the axis of the magnification chamber. The maximum field angle w=0.95°.

In FIG. 7b the diameter of the pupil EP=9.1 mm. The pupil is at a distance of 109.3 mm from the objective along the axis of the magnification changer. The maximum field angle w1=10.64°.

Regarding the scaling and the imaging power achieved, the remarks made concerning the first embodiment apply analogously here. The preferred focal length F of the objective according to the third embodiment is 37.5 mm.

The three embodiments of the objective according to the invention discussed here exhibit good imaging properties and are particularly suitable for stereomicroscopes of the telescopic type for the reasons stated above. It should be pointed out here that the objective according to the invention also has very good imaging properties in the positions falling between the highest and lowest magnifications.

List of Reference Numerals

1 Object
2 Objective
3L, 3R Magnification changes in the left and right hand channels
4L, 4R Tube lens in the left and right hand channels
5L, 5R Picture reversing system in the left and right hand channels
6L, 6R Intermediate image in the left and right hand channels
7L, 7R Eyepiece in the left and right hand channels
8L, 8R Left and right eye
9 Axis of the objective
10L, 10R Left or right hand viewing channel in the stereomicroscope
20 Beam from the centre of the object
21 Beam from the top and bottom edges of the object
22 Single lens (first assembly G1)
23 Single lens (third assembly G3)
c Scaling factor
ENP Diameter of the entry pupil of the magnification changer at maximum magnification
EP Diameter of the entry pupil of the magnification changer
F Focal length of the objective
f1 Focal length of the first assembly (G1) of the objective
f3 Focal length of the third assembly (G3) of the objective
G1 . . . G3 Names of the optical assemblies of which the objective is made up
nA Numerical aperture of an objective
OM Middle of the object field
Oo Top edge of the object field
Ou Bottom edge of the object field
OW Distance of the object plane from the first surface of G1
Rk The last ($k^{th}$) area radius of the second assembly (G2) pointing towards the third assembly G3 of the objective
u, uR, uL Half aperture angle of the cone of rays with its vertex in the centre of the object which is bounded by ENP
w Field angle of the objective
w1 Maximum field angle of the objective at minimum magnification
z Ratio of maximum to minimum magnification of the magnification changer

What is claimed is:

1. An objective (2) for stereomicroscopes of the telescope type which comprises three optical assemblies (G1, G2, G3), the first assembly (G1) being arranged towards the object side and the third assembly (G3) being arranged towards a magnification changer (3L, 3R), wherein the following conditions are met:

$$0.44 \leq \frac{ENP}{F} \leq 0.6$$

and $$\tan(w1) \geq 0.16,$$

where

ENP denotes the diameter of the entry pupil of the magnification changer (3L, 3R) at the maximum magnification, F denotes the focal length of the objective (2) and w1 denotes the maximum field angle of the objective (2) at the lowest magnification of the magnification changer (3L, 3R).

2. The objective according to claim 1, wherein $$0.55 \leq \frac{ENP}{F} \leq 0.6.$$

3. The objective according to claim 1, wherein $$2 < f3/F < 4,$$

where f3 is the focal length of the third optical assembly (G3).

4. The objective according to claim 3, wherein the optical assembly (G3) consists of a single lens (23).

5. The objective according to claim 1, wherein the condition $$0.7 < Rk/F < 1.1$$

is met, where

Rk is the last radius of the second assembly (G2) pointing towards the third optical assembly (G3).

6. The objective according to claim 1, wherein the condition $$OW/F \geq 0.42$$

is met, where

OW is the spacing of the object plane from the first surface of the first optical assembly (G1).

7. The objective according to claim 1, wherein the condition $$1.3 < f1/F < 1.8$$

is met, where f1 is the focal length of the first optical assembly (G1).

8. The objective according to claim 7, wherein the first optical assembly (G1) consists of a single lens (22).

9. The objective according to claim 1, wherein the objective is made up of a maximum of eight lenses.

10. The objective according to claim 1, characterised by the use of glass in a positive lens of the third optical assembly (G3) which satisfies one of the conditions $$|P_{g,F} - 0.6438 + 0.001682 \times v_d| > 0.0075$$

or $$|P_{C,t} - 0.5450 - 0.004743 \times v_d| > 0.025,$$

where $v_d = (n_d - 1)/(n_F - n_C)$ is the Abbe coefficient, $P_{g,F} = (n_g - n_F)/(n_F - n_C)$ is the relative partial dispersion for the wavelengths g and F and $P_{C,t} = (n_C - n_t)/(n_F - n_C)$ indicates the relative partial dispersion for the wavelengths C and t and n denotes the refractive index at the wavelength in question.

11. The objective according to claim 1, wherein the optical assemblies (G1, G2, G3) are made up of a maximum of three different materials.

12. The objective according to claim 1, wherein all the materials used for the optical assemblies (G1, G2, G3) satisfy one of the conditions $$|P_{g,F} - 0.6438 + 0.001682 \times v_d| > 0.0075$$

or $$|P_{C,t} - 0.5450 - 0.004743 \times v_d| > 0.025,$$

where $v_d = (n_d - 1)/(n_F - n_C)$ is the Abbe coefficient, $P_{g,F} = (n_g - n_F)/(n_F - n_C)$ is the relative partial dispersion for the wavelengths g and F and $P_{C,t} = (n_C - n_t)/(n_F - n_C)$ indicates the relative partial dispersion for the wavelengths C and t and n denotes the refractive index at the wavelength in question.

13. The objective according to claim 1, characterised by the construction data in the following Table based on an objective focal length of F=100 mm:

| Assembly | Surface number | Radius (mm) | Distance (mm) | $n_d$ | $v_d$ | $P_{g,F}$ | $P_{C,t}$ |
|---|---|---|---|---|---|---|---|
|  | Object |  | 42.13 |  |  |  |  |
| G1 | 1 | −291.92 | 48.69 | 1.49700 | 81.6 | 0.5375 | 0.8236 |
| G1 | 2 | −65.47 | 1.25 |  |  |  |  |
| G2 | 3 | 2181.33 | 41.95 | 1.49700 | 81.6 | 0.5376 | 0.8236 |
| G2 | 4 | −76.18 | 9.99 | 1.80518 | 25.4 | 0.6161 | 0.6680 |
| G2 | 5 | −145.47 | 0.25 |  |  |  |  |
| G2 | 6 | 137.39 | 52.32 | 1.49700 | 81.6 | 0.5375 | 0.8236 |
| G2 | 7 | −119.86 | 9.99 | 1.61336 | 44.5 | 0.5590 | 0.7936 |
| G2 | 8 | −572.97 | 0.50 |  |  |  |  |
| G2 | 9 | 1128.57 | 23.85 | 1.80518 | 25.4 | 0.6161 | 0.6680 |
| G2 | 10 | −162.05 | 10.36 | 1.61336 | 44.5 | 0.5590 | 0.7936 |
| G2 | 11 | 103.47 | 14.33 |  |  |  |  |
| G3 | 12 | 425.00 | 28.09 | 1.49700 | 81.6 | 0.5375 | 0.8236 |
| G3 | 13 | −240.91 |  |  |  |  |  | wherein the columns of the Table, from left to right, give the assembly number, the surface number, the radius of curvature, the distance from the next surface, the refractive index $n_d$, the dispersion $v_d$ and the partial dispersions $P_{g,F}$ and $P_{C,t}$, where $n_d$ denotes the refractive index, $v_d = (n_d - 1)/(n_F - n_C)$ denotes the Abbe coefficient, $P_{g,F} = (n_g - n_F)/(n_F - n_C)$ denotes the relative partial dispersion for the wavelengths g and F, and $P_{C,t} = (n_C - n_t)/(n_F - n_C)$ denotes the relative partial dispersion for the wavelengths C and t, and an air gap is indicated by a blank cell in the details of materials.

14. A stereomicroscope of the telescope type having an objective (2) according to claim 1 as a main objective.

* * * * *